United States Patent [19]

Weyand et al.

[11] Patent Number: 5,664,761
[45] Date of Patent: Sep. 9, 1997

[54] DISK VALVE

[75] Inventors: Manfred Weyand; Hermann Kott, both of Monchen-Gladbach, Germany

[73] Assignee: Babcock-Sempell AG, Korschenbroich, Germany

[21] Appl. No.: 441,974

[22] Filed: May 16, 1995

[30] Foreign Application Priority Data

May 16, 1994 [DE] Germany .................. 44 170 094.7

[51] Int. Cl.$^6$ .................. F16K 3/10; F16K 39/04
[52] U.S. Cl. .................. 251/283; 251/208
[58] Field of Search .................. 251/283, 208

[56] References Cited

U.S. PATENT DOCUMENTS

| 2,384,318 | 9/1945 | Le Bleu | 251/283 X |
| 3,363,651 | 1/1968 | Boyd | 251/283 X |
| 3,707,169 | 12/1972 | Friedrichs | 251/283 X |

FOREIGN PATENT DOCUMENTS

| 0 442 559 | 8/1991 | European Pat. Off. . |
| 41 35 858 | 5/1993 | Germany . |
| 2 184 210 | 6/1987 | United Kingdom . |
| 2 261 051 | 5/1993 | United Kingdom . |

Primary Examiner—John Rivell
Attorney, Agent, or Firm—Lowe, Price, LeBlanc & Becker

[57] ABSTRACT

A disk valve for a fluid under pressure, inside a housing (10), and comprising one, fixed plate cam (26), which has one port (32). A second, rotatable plate cam (34) which also has a port (36) is mounted above the fixed disk cam (26). The ports (32, 36) are eccentric to the axis of rotation of the rotating disk cam (34) such that they can be brought from an aligned open position into a misaligned closed position by rotating the rotating plate cam (34). A pressure relief surface (44, Ae), concentric to the axis of rotation, is provided on the rotating plate cam (34) and this surface is in contact with the outlet pressure of the fluid, in the closed position at least. To compensate the tilting moment which is exerted on the rotating plate cam (34) due to the off-centre position of the port (32) in the fixed plate cam (26), a slot (74) is made in the upwards facing surface of the fixed plate cam (26) which, in its position and shape, is approximately symmetrical to the cross-sectional form of the port (32) and, for its part, is in contact with the outlet pressure, in the closed position at least.

12 Claims, 8 Drawing Sheets

DISK VALVE

BACKGROUND TO THE INVENTION

The invention concerns a disk valve for a fluid under pressure.

A disk valve is known from DE-A-4135858 which comprises a) a housing with an inlet and an outlet; b) one fixed plate mounted inside the housing, the plate cam having one port for the fluid; c) a second plate cam, also mounted inside the housing, and able to rotate about an axis, this cam resting on the fixed plate cam, and having a second port for the fluid which is not concentric to the axis and which is infinitely variable between an open position in alignment with the first port and a misaligned closed position; and d) a pressure relief surface concentric to the rotating plate cam, which is in contact with the outlet pressure of the fluid, in the closed position at least.

In the known valve, the pressure relief area is formed by the front face of a piston which is moulded on to a guide disk connected to the rotating plate cam. When this known valve is in its closed position, a tilting moment acting on the plate disc develops, which is due to the fact that the pressure relief force caused by the piston is, in fact, concentric to the rotating plate cam which, in contrast, is eccentric to the force of pressure applied to the rotating plate cam in the area around the port in the fixed plate cam. The latter is therefore due to the fact that a sealing band is formed which closely encircles the port of the fixed plate cam—also presumably under the influence of a slight elastic deformation of the rotating plate cam which is "hollow" at this point. The rotating plate cam is therefore largely pressure-compensated outside the area above the port of the fixed plate cam. At very high pressures, the tilting moment caused by the foregoing action can lead to leakage from the disk valve when it is in the closed position. To avoid this with the known valve, the size of the pressure relief area formed on the piston must not be too large. The concept of relieving the pressure from the rotating plate cam can therefore not be carried quite so far as would actually be possible and even desirable if there was no tilting moment phenomenon present.

SUMMARY OF THE INVENTION

The present invention provides a disk valve which operates so that more pressure can be relieved from the rotating plate cam without causing leakage when the valve is in the closed position and high pressures are present.

Accordingly, the invention provides a disk valve of the type referred to above in which a slot is made in the surface of the fixed plate cam facing the rotating plate cam which forms a pressure contact surface on the underside of the rotating plate cam, with which the outlet pressure of the fluid comes into contact, in the closed position at least, the position and size of the slot being selected so that in the closed position the tilting moment caused on the underside of the moving plate cam by the port of the fixed plate cam is virtually at least cancelled out by a tilting moment in the opposite direction created by the slot.

The slot provided in the plate of the valve of the invention does not itself play any part in controlling the flow of fluid. It must not, therefore, be overlapped by the port in the rotating plate cam, in any position of rotation. The sole function of the slot is to bring about a loading of the rotating plate cam, symmetrical to the axis of rotation, with the pressure of the fluid and in so doing prevent a tilting moment which could cause the valve to leak. If there is no such tilting moment, the contact pressure of the rotating plate cam acting on the fixed plate cam in the closed position can be brought closer to the theoretical "zero" limit, at which the pressure relief surface corresponds to the pressure load surface. This continuing relief of pressure from the rotating plate cam reduces both the wear on the two plate cams and also the propulsive power of the motor which is used to move the rotating plate cam.

With a disk valve according to the invention, the following condition should generally be roughly met:

$$A \times l_1 = Ap \times l_2,$$

in which $A$ = the area of the port in the fixed plate cam;

$Ap$ = the area of the slot;

$l_1$ = the distance of the area centre of the cross-section of the first port from the axis of the rotating plate cam;

$l_2$ = the distance of the area centre of the slot from the axis of the rotating plate cam.

The simplest geometrical configuration of a disk valve according to the invention is one in which the position and shape of the slot relative to the axis of the rotating plate cam are approximately point-symmetrical to the position and cross-sectional form of the first port. One particular example of this is the configuration in which both the slot and the port are circular in shape with the same radius.

For practical use, it is important that the angle of rotation between the fully open and the closed position is as great as possible since, in the course of time, the ports in the two plate cams become enlarged by wear: the greater the amount of material in the closed position between the ports in the two plate cams, the more material there is to wear, until finally the valve begins to leak in the closed position. In order to achieve a large angle of rotation between the completely closed and completely open positions, a configuration is preferred in which a) from outside, the second port in the rotating plate cam is convex at least in the area facing the slot in the fixed plate cam; and b) from outside, the slot in the fixed plate cam is convex, at least in the area facing the second port in the rotating plate cam.

Included among these embodiments is, in particular, the configuration in which a) the first port in the fixed plate cam and the second port in the rotating plate cam are roughly circular in cross-section;

b) the slot in the fixed plate cam has a shape which is not circular, whereby from the outside, the area of the contour facing the second port in the rotating plate cam is concave.

Under these geometrical conditions, the rotating plate cam can clearly be turned still further because the port in this cam can then be introduced in the area material of the fixed plate cam which is left as a result of the concave outer contour.

A further increase in the angle of rotation is possible due to the fact that the slot is rotated through a certain angle $\alpha$ from the position which is exactly symmetrical to the port in the fixed plate cam into the closed position. The rotating plate cam can then also be rotated still further through this angle $\alpha$ between the completely closed and completely open position. However, with this configuration, it is no longer possible to fully compensate for the tilting moments which act on the rotating plate cam.

The residual tilting moment can, however, be tolerated and will not cause leakage when the disk valve is in its closed position, provided that the angle α does not exceed the following value:

$$\alpha_{max} = 2 \times \arcsin \frac{b-a}{R}$$

in which a=the distance of the area centre of the slot from a tangent on the rotating plate cam, which is parallel to a straight line drawn through the centre of the cross-sectional area of the first port and the area centre of the slot;

b=the radius of the rotating plate cam;

R=the distance of the area centre of the slot from the axis of rotation of the rotating plate cam.

The relief of pressure from the rotating plate cam and thus also the compensation of the tilting moment are particularly important when the valve is in its closed position, when considerable forces of pressure can occur.

It is possible to dispense with relieving pressure and compensating the tilting moment, at least if the valve is opened above a certain degree, particularly in view of the fact that a certain amount of leakage is tolerable anyway. In a preferred embodiment of the invention, compensation of the tilting moment can be patched in or out, which is characterized in that the route via which the slot comes into contact with the outlet pressure of the fluid is through a recess in the underside of the rotating plate cam which has a limited arc length, whereby arc length and position of the recess are selected in such a way that in the closed position, but not in the fully open position of the rotating plate cam, the slot comes into contact with the outlet pressure of the fluid. The rotating plate cam therefore makes a contact between the slot in the fixed plate cam and the outlet pressure only when near to the closed position.

The arc length of the recess can thereby be dimensioned so that the contact between the slot and the outlet pressure of the fluid is broken if opened by 10 to 20%. If the disk valve is opened further, it is generally not necessary to relieve the pressure nor to compensate for the tilting moment.

It is advisable for the recess to have the shape of a ring segment.

To ensure that a specific pressure is present inside the recess in the fixed plate cam when "patching out" the tilting moment compensation, a configuration is preferred in which the rotating plate cam has a channel connecting the top surface with the underside which in the fully open position, but not in the closed position of the rotating plate cam is in contact with the slot. In the fully open position at least, the rotating plate cam is therefore pressure compensated in the area around the slot; the same inlet pressure of the fluid comes into contact with the top surface and underside.

Preferably, provision is made for the fact that the pressure of the fluid in contact with the pressure relief surface matches that present in the slot. This can be preferred because a compensation of the tilting moment, for which the slot is provided, is only needed for effective pressure relief. If, as described above, the slot can be brought into contact with the inlet and outlet pressure of the fluid, as required, via a route running through the rotating plate cam, pressure relief can also be automatically patched in or out with this embodiment of the invention.

DESCRIPTION OF PREFERRED EMBODIMENTS

Figure 1:
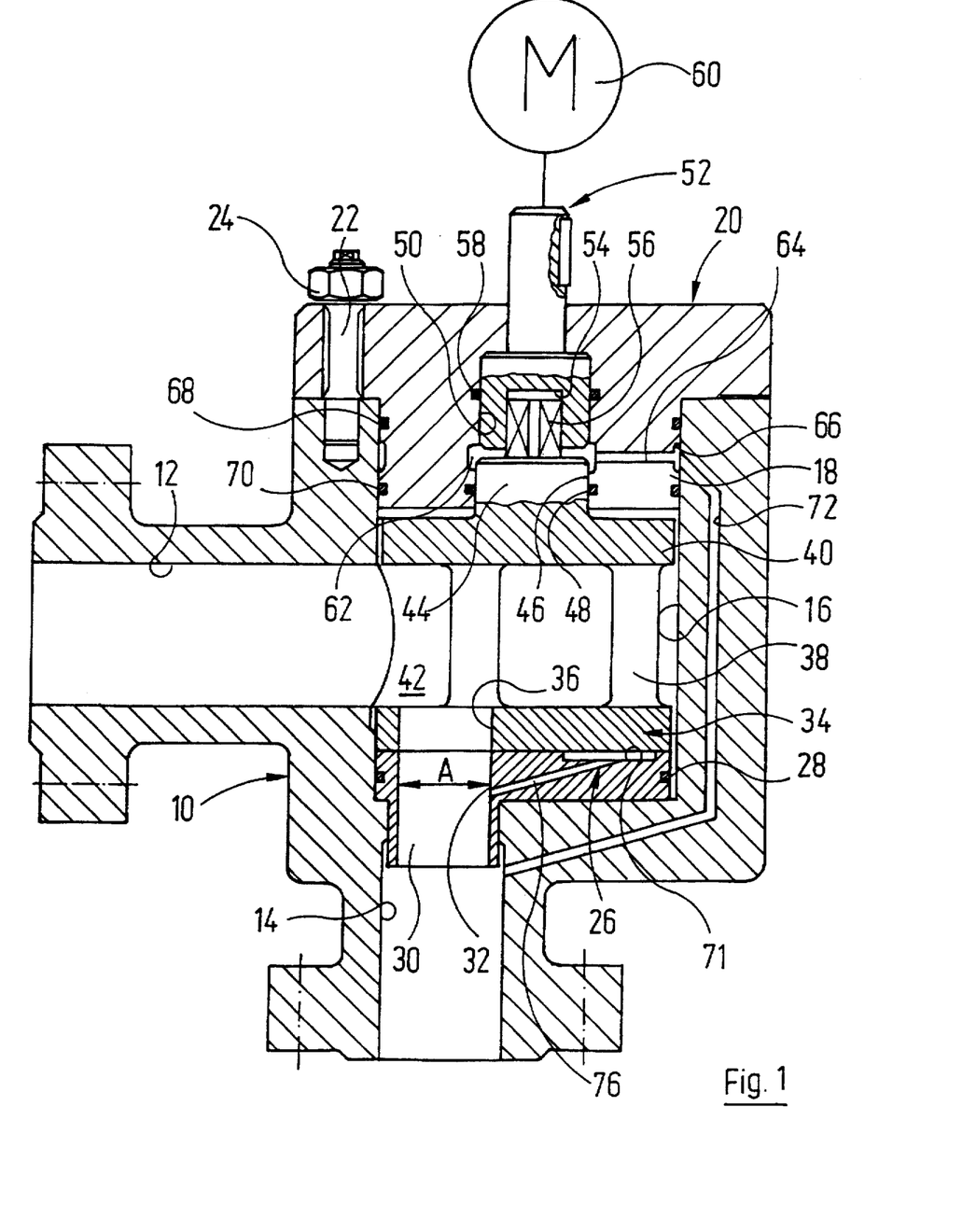
FIG. 1 shows a vertical axial section through a first embodiment of an angle disk valve.

FIG. 1 shows an angle disk valve which has a housing with an inlet channel 12 and also an outlet channel 14 which are arranged at right angles to each other and which are linked respectively to the perimeter wall and base wall of a cylindrical disk chamber 16. The latter is bounded at the top by a cylindrical cover attachment 18 which is part of a housing cover 20 which seals the housing 10 at the top. This housing cover is bolted to the housing 10 by means of stud bolts 22 and nuts 24.

A fixed plate cam 26 fits over the base of the disk chamber 16 and is sealed against the perimeter wall of the disk chamber 16 by means of a sealing washer. A sleeve-shaped attachment 30 for the plate cam 26 has a form-fit seating in the top end section of the outlet channel 14. A port 32 with a circular cross-section is provided in the plate cam 26 concentric to this channel.

The upwards facing surface of the plate cam 26 is machined until it is absolutely plane and has minimal roughness and interacts with the lower surface of a rotating plate cam 34 which has been correspondingly machined. A port 36 is provided in the latter, the diameter of which is the same as that of the port 32 and has the same distance from the disk axis as that of the port 32. In this way, the two ports 32 and 36 move in a straight line position as shown in FIG. 1 and form a smooth through passage.

The plate cam 34 carries an upper guide disk 40 on several moulded-on supports 38 spread out in the peripheral direction which can be rotated in the disk chamber 16 with radial play. As can be seen from FIG. 1, the top surface of the plate cam 34 and the underside of the guide disk are in alignment with the lowermost and topmost point of the inlet channel 12 respectively, with the result that the gap between the plate cam 34 and guide disk 40 forms a distribution space lying in the extension to the inlet channel 12.

A short piston 44 is moulded on to the top surface of the guide disk 40 which runs in a centre cylindrical hole 46 in the cover attachment 18 and is sealed against this by means of a sealing washer 48. In line with the cylindrical hole 46 is a shaft hole 50, in which a short regulating shaft 52 runs, from the underside of which a slaving opening 54 which is square in cross-section rebounds. A square 56 which is moulded on to the top surface of the piston 44 fits in this slaving opening in such a way that it is able to move. A sealing washer 58 seals the shaft hole 50 from the cylindrical outer surface of the regulating shaft 52. A continuously operating motor unit or stepping motor (60), shown only in schematic form in FIG. 1, is provided as a drive unit for the regulating shaft 52.

A ring groove 62 protrudes radially outwards between the cylindrical hole 46 and the shaft hole 50. The ring groove 62 is linked to a feeder groove 66 via at least one radial feeder channel 64 in the cover attachment 18, which is recessed in the outer surface of the cover attachment 18. Sealing washers 68, 70 fitted on both sides of the feeder groove 66 seal the feeder groove 66 from the outside air and the plate chamber 16 respectively.

The feeder groove 66 is in radial alignment with a linking channel 72 which is made in the perimeter wall of the main part of the housing 10 and is linked to the outlet channel 14o.

As can be seen from the drawing, the unit formed by the rotating plate cam 34, the guide disk 40 and the piston 44 is not in a fixed axial position in the housing 10, but can be moved a short distance in the axial direction.

In the conditions under which the disk valve normally operates, the inlet pressure is greater than the outlet pressure. When the unit comprising the rotating plate cam 34, the guide disk 40 and the piston 44 is loaded with the pressure of the fluid, a net force occurs which forces the rotating plate cam 34 on to the fixed plate cam 26. The following description provides a more detailed examination of the pressures being applied:

Without the piston 44, the top surface of the guide disk 40 would therefore be completely inside the disk chamber 16 and so the guide disk 40 alone would be pressure-compensated, because its top surface and Underside, being equal in area, are subjected to the same pressure. As a result of the piston however, the pressure of the fluid resting against it is removed from its front face Ae (see FIG. 4). The result is a force of pressure acting on the guide disk 40 which is directed upwards and which corresponds to the surface Ae of the piston 44. The force of pressure acting on the top surface of the rotating plate cam 34 is consequently relieved by this resulting force of pressure; hereinafter it is therefore referred to also as "relieving force".

The pressure loaded surface Ae of the piston 44 is selected so that it is somewhat smaller than the non pressure compensated surface of the rotating plate cam 34 which would be the result if there were no piston 44. If we first of all disregard a slot made in the top surface of the fixed plate cam 26, the effect of which will be gone into further below, then the aforementioned non pressure compensated surface would essentially correspond to the area of the rotating plate cam 34 covering the port 32 in the fixed plate cam 26, because a sealing band closely encircling the port 32 is positioned between the two plate cams 26 and 34. By this means the aforementioned net force is produced which forces the rotating plate cam 34 on to the fixed plate cam 26. This can be very much smaller than it would without the piston 44. In this way, the rotating moment, which is required to rotate the rotating plate cam 34 relative to the fixed plate cam 26, can be reduced quite considerably. This reduces both the wear on the plate cams 26, 34 and also the power which the drive unit or stepping motor 60 absorbs when rotating the rotating plate cam 34.

If we now look in greater detail at those areas where the unit comprising the rotating plate cam 34, the supports 38 and the guide plate 40 is put under load in the closed position by non-compensated fluid pressure, then the following is established:

Non-compensated fluid pressure is applied to the rotating plate cam 34 in that area which lies above the port 32 in the fixed plate cam 26 (to be more accurate: inside the sealing band encircling the port 32). If this port 32 has an area A at a distance 1 from the axis of rotation of the plate cam 34, then the non pressure compensated surface on the rotating plate cam 34 also has the same form, the same area A and the same distance 1 from the axis of rotation.

The unit comprising the rotating plate cam 34, the guide disk 40 and the piston 44 is also, as mentioned above, not pressure compensated as a result of the upper face Ae of the piston The centre of the upper face of the piston Ae lies on the axis of rotation of the plate cam 34, and is therefore no distance from it. From the geometrical details described, it follows that the non-compensated forces of pressure upwards and downwards being applied to the rotating plate cam 34 are displaced parallel to each other by the distance 1. Without further measures, which will be gone into further below, this displacement by the distance 1 would result in an effective tilting moment, which tries to tilt the unit comprising the rotating plate cam 34, the guide disk 40 and the piston This tilting moment can lead to leakages from the disk valve, particularly at high pressures.

Figure 2:
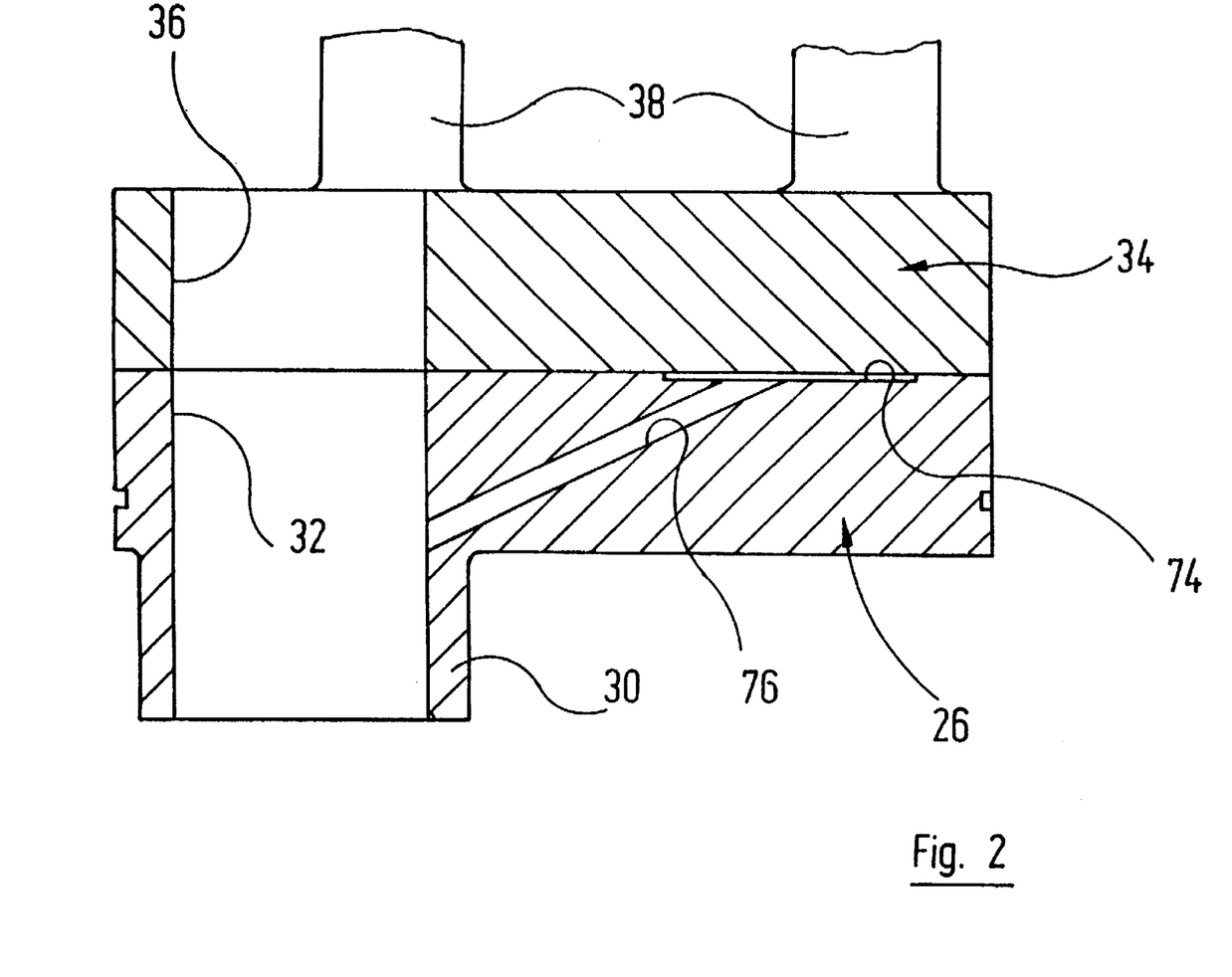
FIG. 2 shows, in greater scale, an axial section through the fixed plate cam and the lower section of the rotating plate cam of the disk valve shown in FIG. 1.
Figure 3:
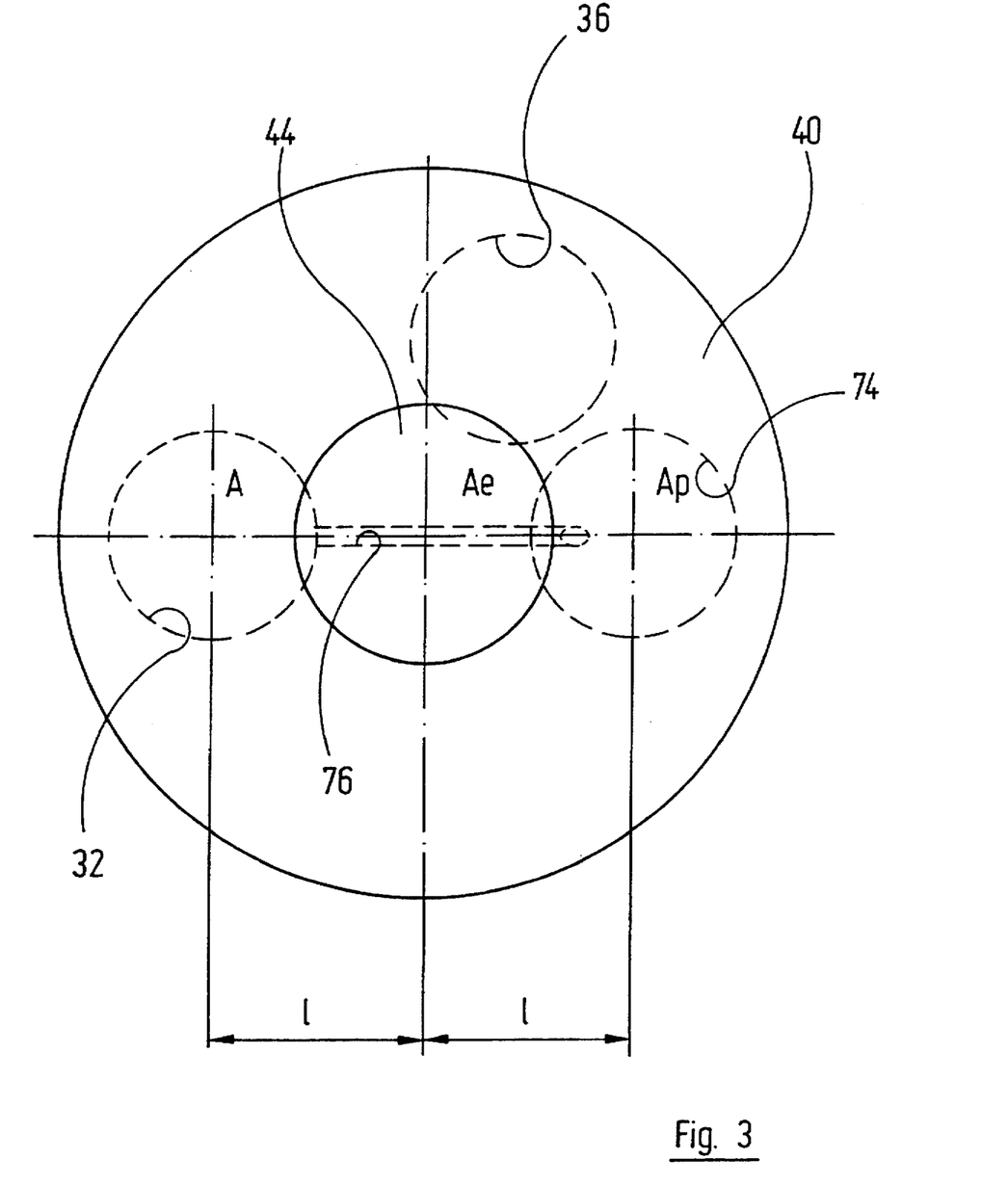
FIG. 3 shows, in diagram form, the plan view of the superposed plate cams of the angle disk valves shown in FIG. 1.

To avoid or reduce this tilting moment, which is due to non-compensated forces of pressure being displaced relative to each other, in the case of the angle disk valve shown in FIGS. 1 to 3, a comparatively flat slot 74 is made in the top face of the fixed plate cam 26, as already mentioned. In this embodiment, the slot 74 is circular (see FIG. 3) and has the same diameter as the port 32 in the fixed plate cam 26; finally, its centre point also has the same distance 1 from the axis of the plate cam 34 as the centre point of the port 32. In the closed position and with fluid pressure applied, a second sealing band is formed between the two disc cams 26 and 34 which closely encircles the slot 74. The slot 74 is connected to the port 32 via a channel 76 running diagonally through the fixed plate cam 26 so that the outlet pressure of the angle disk valve is therefore present inside the slot 74. By virtue of the slot 74, the outlet pressure is applied to the underside of the rotating plate cam 34 above it in the area of a pressure relief surface Ap which matches the geometry of the slot 74; the rotating plate cam 34 is therefore not pressure compensated in this area. As the additional pressure relief surface Ap on the underside of the rotating plate cam 34 is the same size as the pressure relief surface A which lies above the port 32 in the fixed plate cam 26, and furthermore as these two pressure relief surfaces have the same distance 1 from the centre point of the rotating plate cam 34, the tilting moments attributable to locally non-compensated fluid pressures and generated by these two pressure relief surfaces A and Ap cancel one another out. The consequence of this is that the size of the pressure relief surface $A_e$ provided on the upper face of the piston 44 can be more closely matched to the size of the surface on the underside of the rotating plate cam 34 which is subjected to inlet pressure without causing leakage from the angle disk valve. The advantages of pressure relief with respect to wear of the two plate cams 26 and 34 and also the power of the motor 60 used to drive the cams can therefore largely be realized with the configuration of the fixed plate cam 26 having a slot 74 creating an additional pressure relief surface, as described.

The angle disk valve is shown in its closed position in FIG. 3, in which the port 36 in the rotating plate cam 34 therefore lies between the port 32 and the slot in the fixed plate cam 26. To open the angle disk valve, the rotating plate cam 34 must be turned anticlockwise from the position shown in FIG. 3 until the port 36 is in line with the plate cam 32.

When the angle disk valve is in operation, wear phenomena occur on the edges of the ports 32 and 36. These are particularly severe in the facing perimeter areas of these ports 32 and 36 which therefore restrict the through-flow cross-section if there is a slight overlap of these ports 32 and 36, i.e. when the valve is slightly open. In this condition, the rate of flow of the medium passing through the valve is particularly high. In the course of time, the port 32 in the fixed plate cam 26 will therefore become enlarged in the area lying in the right upper quadrant of this port 32 as shown in FIG. 3. As a consequence, the port 32 loses its exact circular form. A corresponding enlargement also occurs on the port 36 in the rotating plate cam 34, indeed in the area shown in FIG. 3, around the port 32. To ensure that the angle disk valve has the maximum service life, it is desirable for the port 36 in the rotating plate cam 34 in the closed position to be rotated away from the port 32 in the fixed plate cam (26) through the maximum angle possible. You see there is then a lot of material available between the two ports 32 and 36, particularly in the closed position of the angle disk valve, which can become worn. There is a limit as to how much the rotating plate cam 34 in the closed position can be rotated—clockwise as shown 36 in FIG. 3—due to the fact that the port 36 must not overlap with the slot 74 in the fixed plate cam 26. When using circular ports 32 and 36 and a circular slot, the position of the rotating plate cam shown in FIG. 3 should roughly represent the final position which can be achieved.

Figure 4:
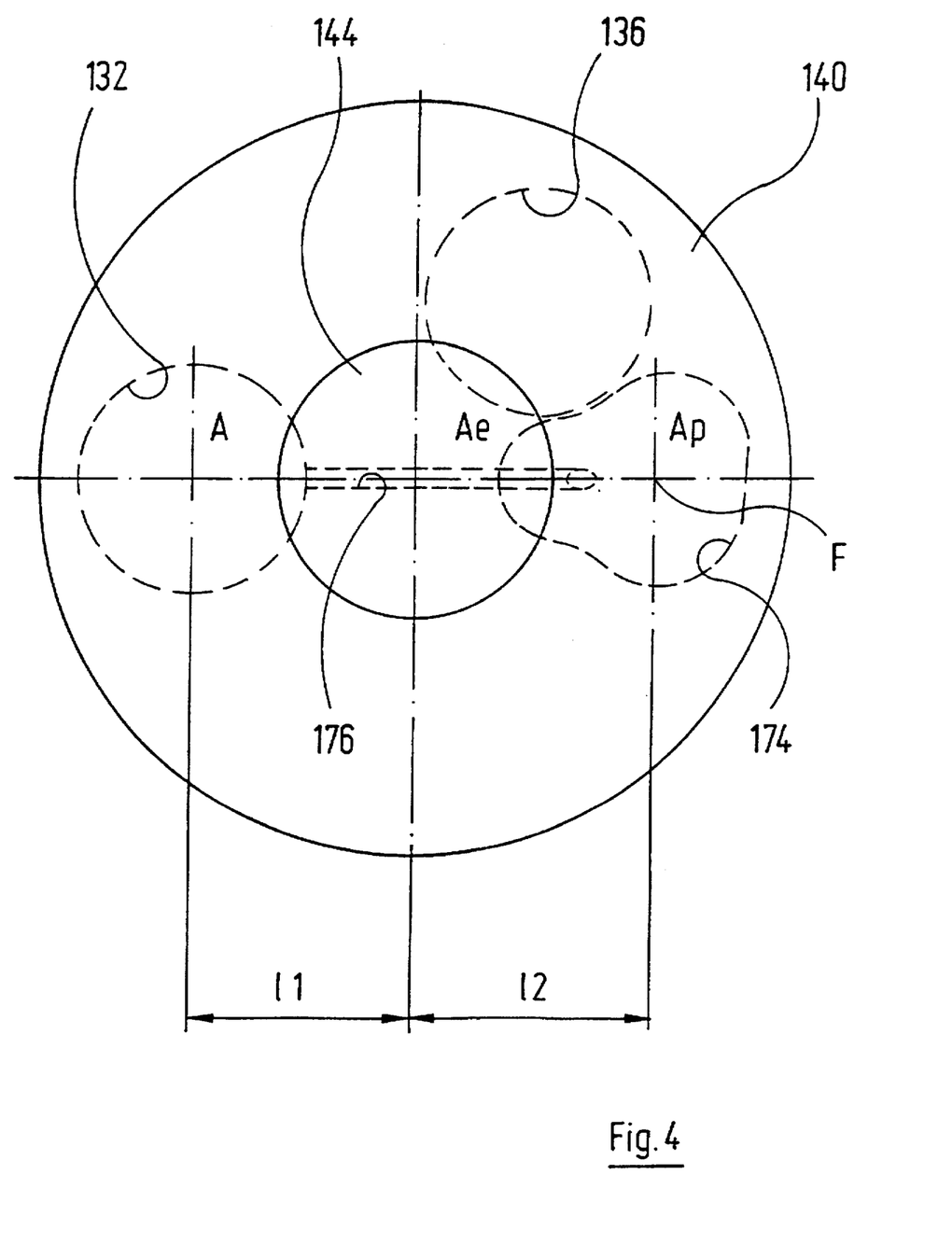
FIG. 4 shows a plan view, similar to that of FIG. 4 (sic), in which the fixed plate cam has been modified from that shown in FIG. 3.

An increase in the angle of rotation of the rotating plate cam 34 between the fully open and the fully closed position can then be achieved if the circular form of the various ports and/or slots is changed. An example of this is shown in FIG. 4. Here, the corresponding parts are identified with the same reference numbers as shown in FIG. 3 but with a one placed before them.

FIG. 4 is once again to be seen as a schematic plan view of the two plate cams, of which only the top surface of the guide disk 140 and also the upper face of the piston 144 can be seen. The dotted line represents the concealed port 132 in the fixed plate cam, the port 136 in the rotating plate cam and the slot 174 in the fixed plate cam. Whilst the ports 132 and 136 are circular as in the embodiment shown in FIG. 3, the slot 174 in the upper face of the fixed plate cam has an outline which is not circular in form, but rather pear-shaped. One of the remarkable features of this outline is that when looked at from the outside, it is concave in the area facing the port 136 in the rotating plate cam. As a result, the rotating plate cam can be turned still further clockwise out of the open position without it overlapping with the slot 174 in the fixed plate cam. The extra "wear material" gained between the ports 132 and 136 can be seen by means of a direct comparison of FIGS. 3 and 4. So as to still achieve the desired effect, i.e. the elimination of the tilting moment, when the outline of the port 132 and/or the slot 174 has a shape other than circular, the following equation must generally be fulfilled:

$$A \times l_1 = Ap \times l_2.$$

where A is once again the area of the port 132 in the fixed plate cam, Ap is the area of the slot 174, which does not have to be equal to the area A, $l_1$ is the distance of the area centre of the port 132 from the axis of the rotating plate cam and $l_2$ is the distance between the area centre F of the slot 174 and the axis of the rotating plate cam.

The available angle of turn between the fully open position and the fully closed position of the rotating plate cam can be increased still further relative to the embodiment shown in FIG. 4, due to the fact that a certain asymmetry is permitted between the port and the slot in the fixed plate cam which provides the pressure relief surface. It is true that in this case the tilting moment cannot be cancelled out completely, but with correct dimensioning, the tilting moment can be reduced to such a level that the rotating plate cam is not able to tilt and therefore no leakage can occur.

Figure 5:
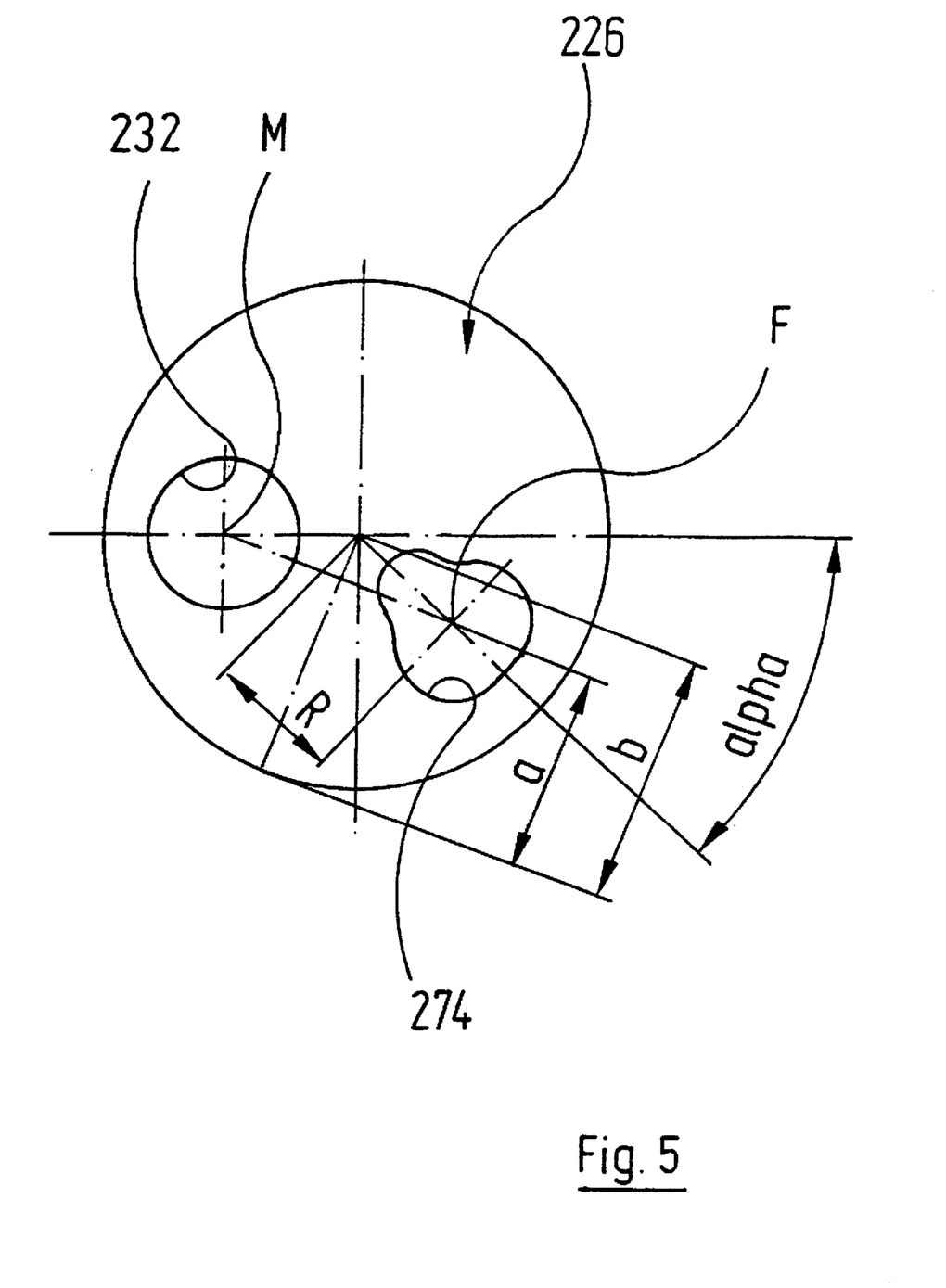
FIG. 5 shows, in smaller scale, a third embodiment of a fixed plate cam, as can be used for the angle disk valves shown in FIG. 1.

As an example of such a configuration, FIG. 5 shows a third embodiment of a fixed plate cam schematically in plan view. Once again, the same reference numbers have been used as in FIGS. 1, 2 and 3, but this time a 2 has been placed in front of them.

The fixed plate cam 226 shown in FIG. 5 also has a port 232 which is circular in cross-section. Once again, a comparatively flat slot 274 has been made in the upper face of the fixed plate cam 226, in which the outlet pressure of the angle disk valve is present by virtue of an appropriate connection. The slot 274 shown in FIG. 5 has the same pear-shaped outline as the slot 174 in the embodiment shown in FIG. 4, but is turned clockwise through an angle α out of a position symmetrical to the port 232. It can be seen that with this geometry not all the turning moments generated by the forces of pressure in the area around the port 232 and the slot 274 can now be fully compensated. However, the rotating plate cam will not tilt as long as the following equation is fulfilled for the maximum permitted angle α max.

$$\alpha_{max} = 2 \times \arcsin \frac{b-a}{R}$$

In this equation:
a = the distance of the area centre F of the slot 274 from a tangent on the rotating plate cam which runs parallel to a straight line which is drawn through the centre point M of the port 232 and the area centre F of the slot 274;
b = the radius of the rotating plate cam;
R = the distance of the area centre F from the axis of the rotating plate cam.

In calculating the quantity α, it is first of all established by what factor D the pressure relief force $F_e$ caused by the piston should, for reasons of safety, be smaller than the non-compensated force of pressure $F_p$ on one of the pressure relief surfaces A or $A_p$ ($F_e = D \ast F_p$). The following equation is then produced:

$$a = D \ast b.$$

In the configuration of fixed plate cam 226 shown in FIG. 5 it can be seen that the rotating plate cam can be rotated through an even greater angle from the open to the closed position than that in the embodiment shown in FIG. 4. Accordingly, a longer service life can be achieved with the configuration shown in FIG. 5 than with the embodiment shown in FIG. 4, and with the same maximum through-flow cross-section.

In all the embodiments described above, the slot provided in the upper face of the fixed plate cam to compensate the tilting moment is permanently in contact with the outlet pressure of the angle disk valve. This means that compensation of the tilting moment can be carried out irrespective of the position of rotation of the rotating plate cam. Compensation of the tilting moment is, however, first and foremost required when the valve is in its closed position when no leakage should occur, whereas a certain tilting of the unit comprising the rotating plate cam, the guide disk and the piston can be tolerated when the valve is in its open positions. In the embodiment shown in FIGS. 6 to 8, the action to compensate the tilting moment is therefore "controllable" in the sense that it is effective, irrespective of the position of rotation of the rotating plate cam and first and foremost when the valve is in its closed position.

Figure 6:
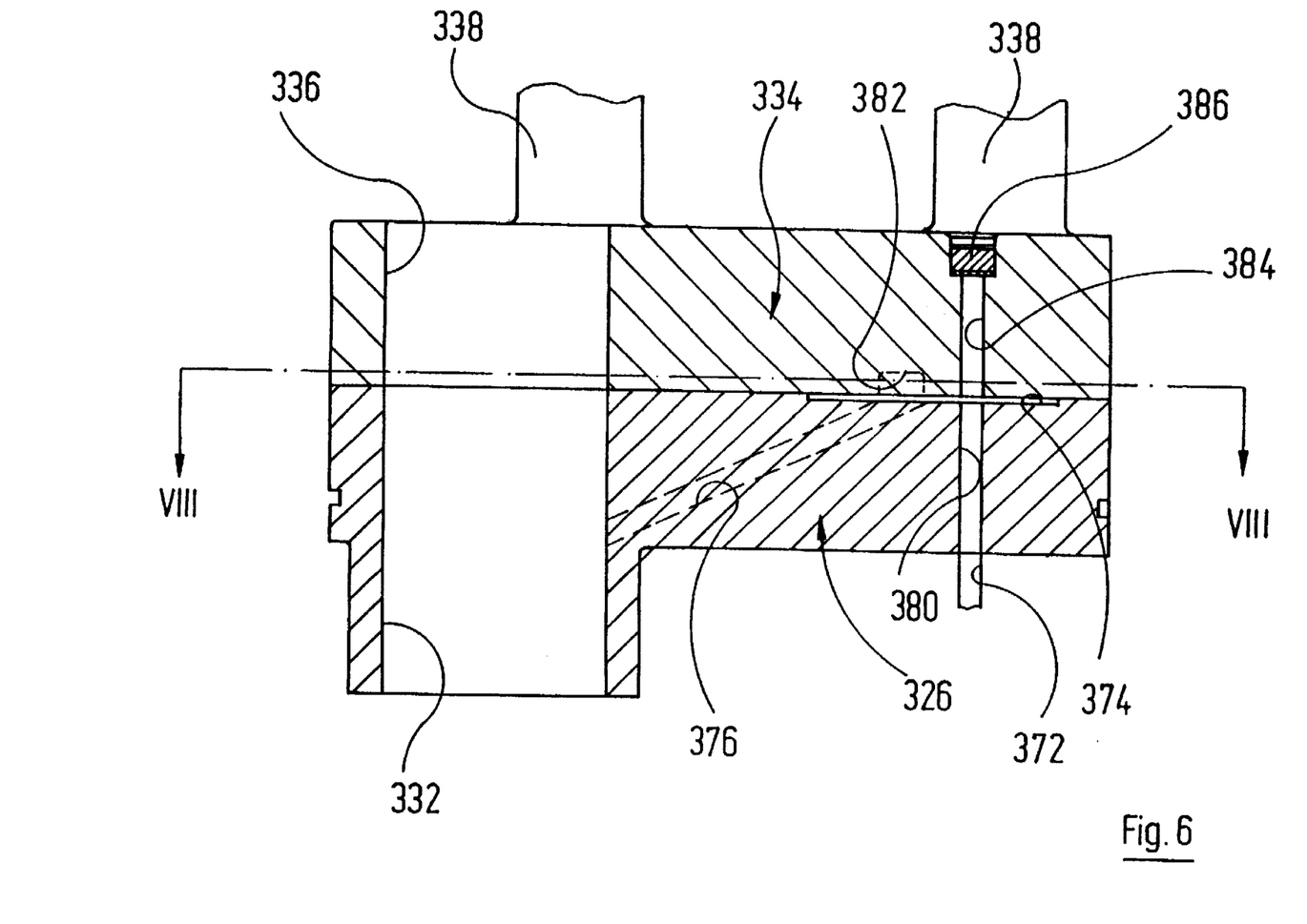
FIG. 6 shows an axial section, similar to FIG. 2, through two further modified plate cams, as can be used for the angle disk valve shown in FIG. 1.
Figure 7:
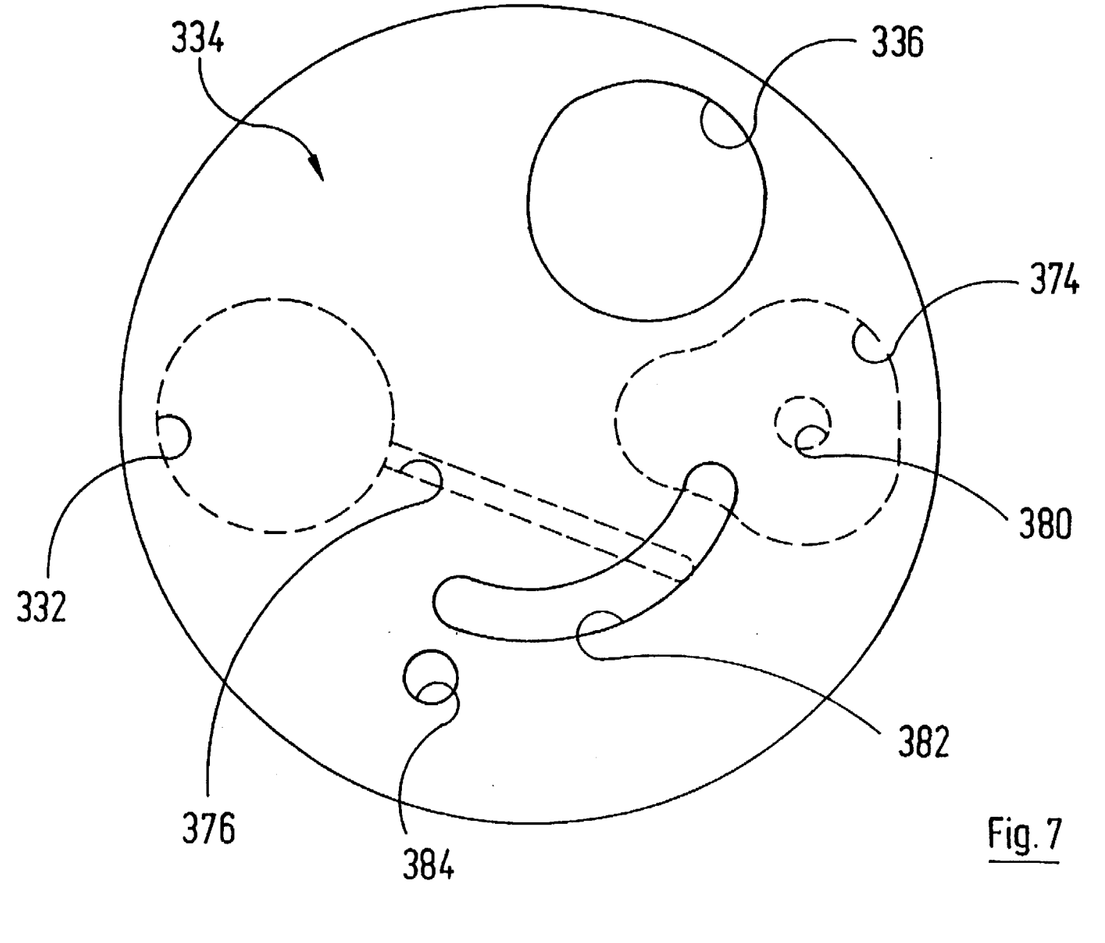
FIGS. 7 and 8 are schematic sections through a line VIII—VIII on FIG. 6, but with the rotating plate cam in different positions of rotation and, for reasons of clarity, without the hatching designating the cut material.
Figure 8:
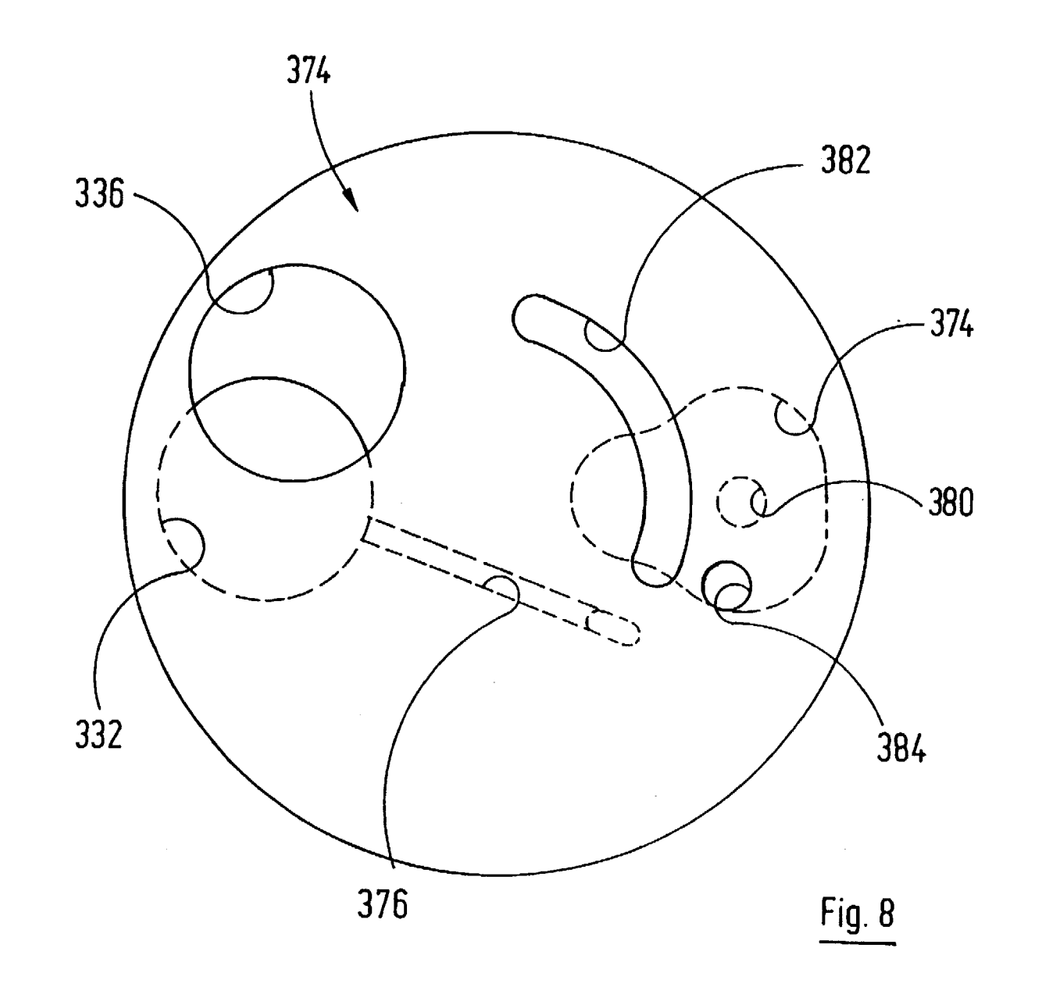

In FIGS. 6 to 8, the corresponding components are identified with the same reference numbers as those in FIGS. 1 to 3, but with a 3 placed in front.

As in FIG. 2, FIG. 6 also shows a fixed plate cam 326 and also a rotating plate cam 334 which is connected to a guide disk (not illustrated) via a support 338. A port 332 in the fixed plate cam 326, which is circular in cross-section, lines up with a port 336 in the rotating plate cam 334 when the angle disk valve is in the fully open position. Once again, a flat slot 374 is provided in the upper face of the fixed plate cam 326, the shape and position of which matches the flat slot 174 in the embodiment shown in FIG. 4. In the embodiment shown in FIGS. 6 to 8, the connection channel 376 from the port 332 no longer, however, leads directly to the slot 374 but terminates in the upper face of the fixed plate cam 326 at a position some distance away from the slot 374. This can be seen particularly in FIGS. 7 and 8. Whereas in the embodiment shown in FIG. 1 the pressure relief surface Ae on the piston 44 was directly connected to the outlet channel 14 via channels 64 and 72, with the embodiment shown in FIGS. 6 to 8, the channel 372 is linked to a channel 380 which goes vertically through the fixed plate cam 326 from bottom to top, terminating at the top in the slot 374. This means that there is always the same pressure on the pressure relief surface Ae of the pressure relief piston as there is in the slot 374 in the fixed plate cam.

In the embodiment shown in FIGS. 1 to 3 and described above, the underside of the rotating plate cam 34 was completely flat. This is not the case with the embodiment shown in FIG. 6. In this case, a groove 382 in the form of a ring segment is made in the underside of the rotating plate cam 334, concentric to the centre point of the plate cams 326 and 334. The position of the groove 382 relative to the linking channel 376 and the slot 374 and also to its angular extension is the result of the mode of operation described below:

First of all, the closed position of the angle disk valve as shown in FIG. 7 should be observed. This Figure represents a section along the line VIII—VIII in FIG. 6, but whereas FIG. 6 shows the rotating plate cam 334 in the open position, FIG. 7 shows the same cam in the closed position. The hatching, which represents the material cut from the rotating plate cam 334, was omitted from FIG. 7 in order to make the geometrical relationship between the groove 382, the slot 374 and the connection channel 376 clearer. In FIG. 7, the space inside the port 332 is obviously connected to the slot 374 via the connection channel 376 and part of the groove 382 and from there is connected to the front face of the pressure relief piston by means of the channels 380 and 372. Both the relief of pressure and also compensation of the tilting moment are in this way "patched in" by means of the slot 374.

If the rotating plate cam 334 is now rotated anticlockwise from the fully open position shown in FIG. 7 into the closed position, then first of all the groove 382 on the underside of the rotating plate cam 334 will move away across the point at which the channel 376 terminates; the space inside the port 332 and the slot 374 also remain in contact. If, however, the rotating movement of the rotating plate cam 334 is continued, then a position of rotation will finally be reached in which the after end of the groove 382 has moved away across the point at which the channel 376 terminates in the upper face of the fixed plate cam 326. The link between the space inside the port 332 and the slot 374 is now broken. To begin with, there is still certainly outlet pressure in the slot 374 and therefore also on the pressure relief surface Ae of the pressure relief piston, but this pressure increases in the course of time due to slight leakages.

The link between the inner space of the port 332 and the slot 374 should be broken when the rotating plate cam 334 is in a position of rotation, which roughly corresponds to being open 10 to 20%. In the position shown in FIG. 8, this point has already been exceeded; a gap between the after end of the groove 382 in the rotating plate cam 334 and the outlet point of the connection channel can clearly be seen.

FIGS. 6 to 8 show a channel 384 which goes vertically through the rotating plate cam 334 from the lower to the upper surface. A filter 386 is inserted in an upper, extended area of the channel 384. The distance of the channel 384 from the centre point of the plate cams 326 and 334 is such that it is in contact with the slot 374 when the rotating plate cam 334 is in certain positions of rotation. The angular position of the channel 384 is such that this contact with the slot 374 can only occur if the direct contact between the port 332 and the slot 374 is broken via the channel 376 and the groove 382. The connections are particularly clearly illustrated in FIG. 8.

The function of the channel 384 is as follows. When the valve is in the closed position, as shown in FIG. 7, the outlet point of the channel 384 is outside the area of the slot 374, with the result therefore that the channel 384 is sealed at the bottom. Only when the angle disk valve is in those open positions in which there is no longer any direct contact between the slot 374 and the outlet pressure, as described above, does the lower outlet point of the channel 386 move into the area above the slot 374. Now the pressure in the slot 374 in the fixed plate cam 326 above the filter 386 and the channel 384 in the rotating plate cam 334 is no longer an outlet pressure, but an inlet pressure. This is transferred via the channel 380 in the fixed plate cam 326 and also the channel 372 to the pressure relief surface Ae of the pressure relief piston, with the result that the pressure relief is compensated.

What is claimed is:

1. Disk valve for fluid under pressure, comprising:

a) a housing with an inlet and an outlet;

b) a fixed first control disk mounted inside the housing and having a first fluid control port;

c) a second control disk which can be rotated about an axis, also mounted inside the housing and which rests on the first control disk and has a second fluid control port which is not concentric to the axis, the second control disk being continuously adjustable between an open position in which the second fluid control port is in alignment with the first fluid control port and a closed position in which the second fluid control port is not aligned with the first fluid control port;

d) a concentric pressure relief surface associated to the second control disk, which is in contact with an outlet pressure of the fluid, at least when the second control disk is in the closed position;

e) a recess provided in the surface of the first control disk to be facing the second control disk, so that the recess forms a pressure contact surface on an underside of the second control disk, the pressure contact surface being in contact with the outlet pressure of the fluid in its closed position, its open position, and intermediate positions, the choice of position and size of the recess being such that in the closed position of the second control disk, a tilting moment caused by fluid pressure acting on an underside of the second control disk by the first fluid control port in the fixed control disk is at least virtually cancelled out by a tilting moment acting in an opposite direction due to the presence of the recess.

2. The disk valve according to claim 1, wherein:

the relationship $A \times l_1 = Ap \times l_2$ is approximately satisfied, wherein A=an area of the first fluid control port;

Ap=an area of the recess;

$l_1$=a distance from the area center point of cross-section of the first fluid control port to the axis; and $l_2$=distance from the area center point of the recess to the axis.

3. The disk valve according to claim 1, wherein:

the position and shape of the recess relative to the axis are approximately point-symmetric to the position and cross-sectional form of the first fluid control port.

4. The disk valve according to claim 1, wherein:

when viewed from outside the disk valve, (a) the second fluid control port is convex at least in an area facing the in the fixed plate cam recess, and (b) the recess is concave at least in an area thereof facing the second port.

5. The disk valve according to claim 4, wherein:

(a) the first fluid control port and the second fluid control port are each roughly circular in cross-section, and (b) the recess has a non-circular form so that, viewed from the outside of the disk valve, said area facing the second fluid control port is concave.

6. The disk valve according to claim 1, wherein:

the recess can be rotated through an angle $\alpha$ from a position which is exactly symmetrical to the first fluid control port into the closed position.

7. The disk valve according to claim 6, wherein:

the angle $\alpha$ does not exceed the value $$\alpha_{max} = 2 \times \arcsin \frac{b-a}{R},$$

in which a=a distance of the area center of the recess from a tangent on the second control disk, which is parallel to a straight line drawn through the center of the cross-sectional area of the first fluid control port and the area center of the recess;

b=a radius of the second control disk; and

R=a distance of the area center of the recess from the axis.

8. The disk valve according to claim 1, wherein:

a route via which the recess comes into contact with the outlet pressure of the fluid is through a recess on the underside of the second control disk and has a limited arc length, the arc length and position of the recess being selected such that in the closed position of the first control disk, but not in its fully open position, the recess is subjected to an outlet pressure of the fluid.

9. The disk valve according to claim 8, wherein:

the arc length of the recess is dimensioned in such a way that contact between the recess and the outlet pressure of the fluid is broken if it is opened by between 10 to 20%.

10. The disk valve according to claim 8, wherein:

the recess has the form of a ring segment.

11. The disk valve according to claim 1, wherein:

the second control disk has a channel connecting a top surface with an underside which in the fully open position of the second control disk, but not in its closed position, comes into contact with the recess.

12. The disk valve according to claim 1, wherein:

the pressure of the fluid coming into contact with a pressure relief surface matches the pressure present in the recess.

* * * * *